United States Patent
Guo et al.

(10) Patent No.: US 8,472,709 B2
(45) Date of Patent: Jun. 25, 2013

(54) APPARATUS AND METHOD FOR REDUCING ARTIFACTS IN IMAGES

(75) Inventors: Ju Guo, Arcadia, CA (US); Dong-Qing Zhang, Burbank, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 478 days.

(21) Appl. No.: 12/452,258

(22) PCT Filed: Jun. 29, 2007

(86) PCT No.: PCT/US2007/015205
§ 371 (c)(1), (2), (4) Date: Dec. 22, 2009

(87) PCT Pub. No.: WO2009/005497
PCT Pub. Date: Jan. 8, 2009

(65) Prior Publication Data
US 2010/0135575 A1  Jun. 3, 2010

(51) Int. Cl.
*G06K 9/34* (2006.01)
*G06K 9/40* (2006.01)

(52) U.S. Cl.
USPC .......................................... 382/164; 382/275

(58) Field of Classification Search
USPC ................. 382/164, 165, 173, 224, 264, 274, 382/275, 312; 358/515; 345/589, 611
See application file for complete search history.

(56) References Cited

U.S. PATENT DOCUMENTS

| | | | |
|---|---|---|---|
| 4,959,730 A | 9/1990 | Tai et al. | |
| 5,949,434 A | 9/1999 | Charlton | |
| 7,181,362 B2 * | 2/2007 | Ratti et al. | 702/152 |
| 7,239,321 B2 * | 7/2007 | Berger | 345/473 |
| 8,078,255 B2 * | 12/2011 | Bhandarkar et al. | 600/407 |
| 2003/0001871 A1 | 1/2003 | Morita | |
| 2004/0263538 A1 | 12/2004 | Ohta et al. | |
| 2005/0077469 A1 | 4/2005 | Kaushal | |
| 2006/0087695 A1 | 4/2006 | Keithley et al. | |
| 2006/0270912 A1 | 11/2006 | Villain et al. | |

FOREIGN PATENT DOCUMENTS

| | | |
|---|---|---|
| EP | 0810771 | 12/1997 |
| EP | 1100259 | 2/2004 |
| JP | 3242506 | 10/1991 |
| JP | 522709 | 1/1993 |

(Continued)

OTHER PUBLICATIONS

Ahn et al.: "Flat-Region Detection and False Contour Removal in the Digital TV Display," 2005 IEEE International Conference on Multimedia and Expo IEEE, 4 pages.

(Continued)

*Primary Examiner* — Kanjibhai Patel
(74) *Attorney, Agent, or Firm* — Robert D. Shedd; Robert B. Levy (57) ABSTRACT

An apparatus and method of the present disclosure provides an automatic banding region detection function for detecting an image region that has a smooth linear transition of color intensity and is prone to have banding artifacts in image processing. The apparatus and method use a parametric model based approach to detect the banding region. The apparatus and method provide for segmenting at least one first image into at least one homogeneous color region (304), estimating the linear transition of color intensity for the at least one homogeneous color region (308), and if the linear transition of color intensity is substantially smooth, classifying the at least one homogenous color region as a banding region (310).

28 Claims, 5 Drawing Sheets

FOREIGN PATENT DOCUMENTS

| | | |
|---|---|---|
| JP | 7-212760 | 8/1995 |
| JP | 11-088909 | 3/1998 |
| JP | 11-306334 | 11/1999 |
| JP | 11-327497 | 11/1999 |
| JP | 2001126029 | 5/2001 |
| JP | 2003189096 | 7/2003 |
| JP | 2005/517162 | 6/2005 |
| JP | 2006/521150 | 9/2006 |
| SE | 0402576 | 10/2004 |
| WO | WO 2005/083634 | 9/2005 |
| WO | WO2006046913 | 5/2006 |
| WO | WO2008088370 | 7/2008 |
| WO | WO2008088373 | 7/2008 |

OTHER PUBLICATIONS

Lee et al.: "Two-Stage False Contour Detection Using Directional Contrast Features and Its Application to Adaptive False Contour Reduction," IEEE Transactions on Consumer Electronics IEEE USA, vol. 52, No. 1, Feb. 2006, pp. 179-188.

International Search Report, dated Jul. 10, 2008.

Balsys et al.: "Ray Tracing Surfacing with Contours": Computer Graphics Forum; vol. 22; No. 4, pp. 743-752; Dec. 2003.

Kappel: "Shading: Fitting a Smooth intensity Surface"; Computer Aided Design; vol. 27, No. 8, pp. 595-603. Aug. 1995.

* cited by examiner

APPARATUS AND METHOD FOR REDUCING ARTIFACTS IN IMAGES

This application claims the benefit, under 35 U.S.C. §365 of International Application PCT/US2007/015205 filed Jun. 29, 2007 which was published in accordance with PCT Article 21(2) on Jan. 8, 2009 in English.

The present disclosure generally relates to digital image processing and display systems, and more particularly, to an apparatus and method for reducing artifacts in images, wherein a region in an image including artifacts, e.g., a banding region, is automatically detected without user intervention.

Image artifacts are noticed during processing of a digital image, or images such as a sequence of images in a film. A common artifact phenomenon is banding where bands of varying intensity and color levels are displayed on an original smooth linear transition area of the image. Processing like color correction, scaling, color space conversion, and compression can introduce the banding effect. Banding is most prevalent in animation material where the images are man-made with high frequency components and minimum noise. Any processing with limited bandwidth will unavoidably cause alias, "ringing" or banding.

The current state of art is to add noise, such as dithering and error diffusion, to reduce the artifacts in the image. The noise masks the phenomenon to a degree, but introduces undesired noise on other parts of the image, and introduces additional burden to other processing such as compression.

In a related field, due to the large size of the data files required to produce a high quality representation of a digitally sampled image, it is common practice to apply various forms of compression to the data file in an attempt to reduce the size of the data file without adversely affecting the perceived image quality. Various well-known techniques and standards have evolved to address this need. Representative of these techniques is the Joint Photographic Experts Group (JPEG) standard for image encoding. Similar to JPEG, but with the addition of inter-frame encoding to take advantage of the similarity of consecutive frames in a motion sequence is the Moving Pictures Expert Group (MPEG) standard. Other standards and proprietary systems have been developed based on wavelet transforms.

In the process of a commercial movie DVD/HD-DVD release, a digital image that is scanned from conventional film, or from a computer animated movie, typically has 10-bit data and, in certain applications, up to 16-bit data. The data is required to be converted to an 8-bit YUV format for compression. Due to the reduction of bit depth precision, banding artifacts often show up in the areas of the image, or images, with smooth color change. As described above, dithering and error diffusion algorithms are commonly used to reduce the banding artifacts. In most dithering algorithms, a digital signal with high spatial frequency is added to the image to mask out the banding effect. However, the compression inside a DVD/HD-DVD is a lossy compression that removes signals with high spatial frequency. Therefore, the banding artifacts frequently show up after compression even if the banding is masked out by a dithering process before the compression.

The traditional approach for dithering or color depth reduction is for display applications and printing service. Since the dithering is the last step in the processing chain, added high spatial frequency is well preserved and serves the purpose of masking the banding effect when the color depth is reduced. Error diffusion is another common approach, where a quantization error is distributed around the neighboring pixels to generate masking effects and preserve overall image intensity. However, these approaches fail to consider the effect of a lossy compression, such as like MPEG1, 2, 4 or H.264, which tend to reduce or truncated the high frequency signal. Therefore, most of the dithering and error diffusion approaches will decrease the bit rate efficiency in the compression process, since a compression encoder will use a number of bits to represent the added dithering noise or quantization error and have fewer bits to represent the image. Meanwhile, the banding artifacts are prone to show up after the compression since the masking signal has been reduced or truncated.

Additionally, the artifact reduction process is further complicated by requiring user intervention to determine where in the image an artifact is appearing. This makes the artifact reduction process a time-consuming process for the user or operator.

Therefore, a need exists for techniques for reducing artifacts in images where the artifacts will remain reduced or suppressed after an image processing, e.g., a lossy compression process. Furthermore, a need exists for techniques for automatically detecting a region in an image including artifacts to lessen operator intervention.

An apparatus and method of the present disclosure provides an automatic banding region detection algorithm or function for detecting an image region that has a smooth linear transition of color intensity and is prone to have banding artifacts in image processing. The apparatus and method use a parametric model based approach to detect the banding region. A banding region is defined as a region with smooth intensity or color transition. This type of region tends to have bands or false contours after image processing, such as quantization, color correction etc. A linear surface model is used to model the intensity of pixels in the region. If the region can be closely represented by the linear surface model, the region is classified as a banding region.

The apparatus and method first segments the image into homogeneous color regions. Since different type of regions such as edge region, texture region and smooth region can exist in the same image, the apparatus and method segments the image into a number of regions based on their color or luminance intensity. If the segmented regions meet certain criteria such as size, statistical color distribution, etc., the segmented region will be selected as a candidate for banding regions. The intensity or color of pixels in the region will be fitted to a linear surface to verify if the region is a banding region. A parametric model is used to estimate the color linear transition for each region. A region is classified as a banding region if a smooth linear transition of color intensity exists in the region.

According to one aspect of the present disclosure, a method for detecting a banding region in an image is provided. The method includes segmenting at least one first image into at least one homogeneous color region; estimating the linear transition of color intensity for the at least one homogeneous color region; and if the linear transition of color intensity is substantially smooth, classifying the at least one homogenous color region as a banding region.

In another aspect, an apparatus for detecting a banding region in an image includes an image segmentation module configured for segmenting at least one first image into at least one homogeneous color region; a linear transition estimator configured for estimating the linear transition of color intensity for the at least one homogeneous color region; and a region detection module configured for classifying the at least one homogenous color region as a banding region if the linear transition of color intensity is substantially smooth.

According to a further aspect of the present disclosure, an apparatus for detecting a banding region in an image includes means for segmenting at least one first image into at least one homogeneous color region; means for estimating the linear transition of color intensity for the at least one homogeneous color region; and if the linear transition of color intensity is substantially smooth, means for classifying the at least one homogenous color region as a banding region.

In yet another aspect, a program storage device readable by a machine, tangibly embodying a program of instructions executable by the machine to perform method steps for detecting a banding region in an image is provided, the method includes segmenting at least one first image into at least one homogeneous color region; estimating the linear transition of color intensity for the at least one homogeneous color region; and if the linear transition of color intensity is substantially smooth, classifying the at least one homogenous color region as a banding region.

These and other aspects, features, and advantages of the present disclosure will be described or become apparent from the following detailed description of the preferred embodiments, which is to be read in connection with the accompanying drawings.

In the drawings, wherein like reference numerals denote similar elements throughout the views.

It should be understood that the drawing(s) is for purposes of illustrating the concepts of the disclosure and is not necessarily the only possible configuration for illustrating the disclosure.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Banding phenomenon can be classified into two categories. In the process of color bit reduction or color quantization, banding can appear due to the reduced signal precision. This type of error can be effectively removed by using an error diffusion algorithm in most of the cases. However, other processes such as color correction, scaling, and color space conversion, contribute to banding artifacts due to their limited processing bandwidth. This type of banding cannot be effectively handled by error diffusion. A masking signal is required to mask out these banding artifacts. The amount of masking signal added is directly related to the intensities of the banding artifacts.

Furthermore, bands of varying intensity and color levels are commonly displayed on an original smooth linear transition area of an image. The banding area is required to be identified for effectively removal of the bands. Since banding artifacts most likely appear in the smooth linear transition, a frame-based approach will introduce an unnecessary masking signal into regions without banding artifacts, thus reducing the image quality. The apparatus and method of the present disclosure provides a region or ROI-based (i.e., region of interest based) approach that effectively removes banding, where the amount of masking signal added can be adjusted by a human operator to achieve the best possible image quality. The apparatus and method of the present invention also provides for automatic detection of banding regions.

An apparatus and method of the present disclosure provides an automatic banding region detection algorithm or function for detecting an image region that has a smooth linear transition of color intensity and is prone to have banding artifacts in image processing. The apparatus and method use a parametric model based approach to detect the banding region. A banding region is defined as a region with smooth intensity or color transition. This type of region tends to have bands or false contours after image processing, such as quantization, color correction etc. A linear surface model is used to model the intensity of pixels in the region. If the region can be closely represented by the linear surface model, the region is classified as a banding region.

The apparatus and method first segments the image into homogeneous color regions. Since different type of regions such as edge region, texture region and smooth region can exist in the same image, the apparatus and method segments the image into a number of regions based on their color or luminance intensity. If the segmented regions meet certain criteria such as size, statistical color distribution, the segmented region will be selected as a candidate for banding regions. The intensity or color of pixels in the region will be fitted to a linear surface to verify if the region is a banding region. A parametric model is used to estimate the color linear transition for each region. A region is classified as the banding region if a smooth linear transition of color intensity exists in the region.

The automatic banding region detection can be incorporated into a region-based banding removal system or apparatus. The present disclosure also provides a ROI-based (region of interest-based) error diffusion and band-masking scheme designed to remove the banding in the detected banding region, and minimize the side-effects on other processing, e.g., a compression process. For the apparatus to be efficient for practical application in the film/video processing, a region-based tracking algorithm is provided to track the ROI, e.g., the detected banding region, into a number of following frames, thus alleviating the effort of a human operator.

Figure 1:
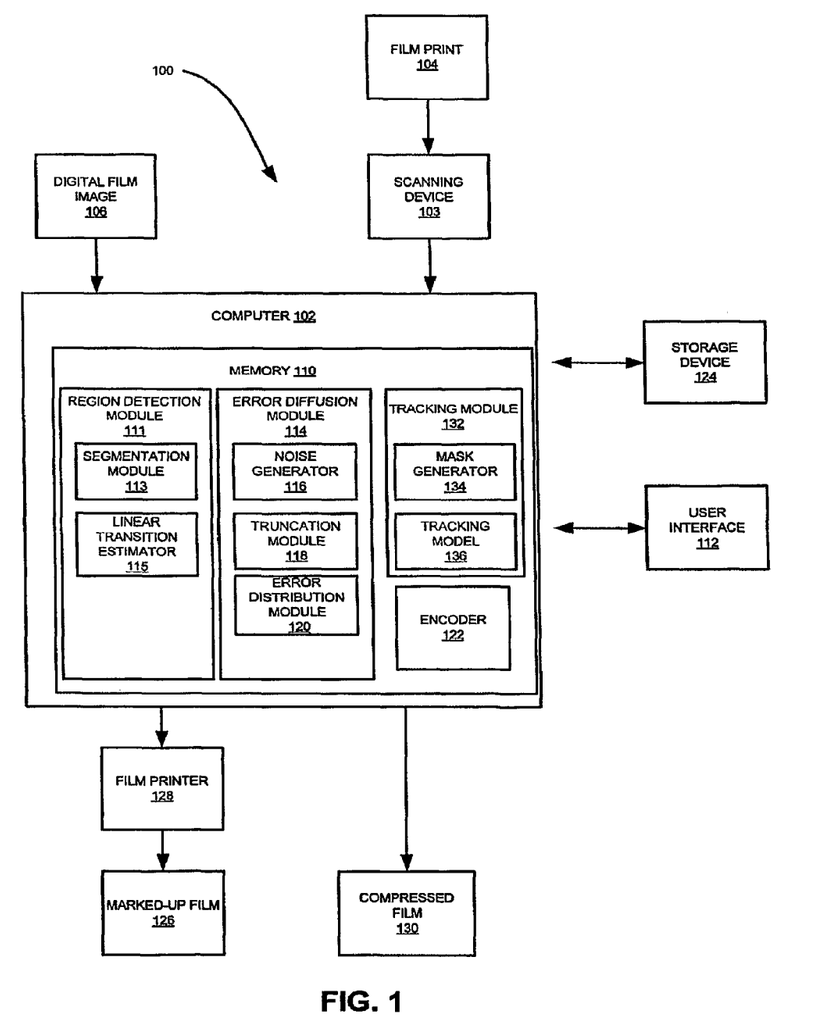
FIG. 1 is an exemplary illustration of an apparatus for reducing artifacts in images according to an aspect of the present disclosure.

Referring now to the Figures, exemplary apparatus components according to an embodiment of the present disclosure are shown in FIG. 1. A scanning device or apparatus 103 may be provided for scanning film prints 104, e.g., camera-original film negatives, into a digital format, e.g. Cineon-format or SMPTE DPX files. The scanning device 103 may comprise, e.g., a telecine or any device that will generate a video output from film such as, e.g., an Arri LocPro™ with video output. Alternatively, files from the post production process or digital cinema 106 (e.g., files already in computer-readable form) can be used directly. Potential sources of computer-readable files are AVID™ editors, DPX files, D5 tapes etc.

Scanned film prints are input to a post-processing apparatus 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse, joystick, etc.) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as post-processing apparatus 102. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printing a revised version of the film 126, e.g., a stereoscopic version of the film.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes an error diffusion module 114 stored in the memory 110 for reducing artifacts in images. The error diffusion module 114 includes a noise or signal generator 116 for generating a signal to mask artifacts in the image. The noise signal could be white noise, Gaussian noise, white noise modulated with different cutoff frequency filters, etc. A truncation module 118 is provided to determine the quantization error of the blocks of the image. The error diffusion module 114 also includes an error distribution module 120 configured to distribute the quantization error to neighboring blocks.

A region detection module 111 is provided for detecting banding regions in at least one image. The region detection module 111 includes an image segmentation module 113 configured for segmenting at least one first image into at least one homogeneous color region. A linear transition estimator 115 is provided and configured for estimating the linear transition of color intensity for a segmented homogeneous color region. The linear transition estimator 115 employs a linear parametric model to model the surface of a segmented region. The region detection module 115 is further configured for classifying the homogenous color region as a banding region if the linear transition of color intensity is substantially smooth, the details of which will be described below.

A tracking module 132 is also provided for tracking a ROI, e.g., a detected banding region, through several frames of a scene. The tracking module 132 includes a mask generator 134 for generating a binary mask for each image or frame of a scene. The binary mask is generated from a defined ROI in an image, e.g., by a user input polygon drawn around the ROI or by the region detection module 111. The binary mask is an image with pixel value either 1 or 0. All the pixels inside the ROI have a value of 1, and other pixels have a value of 0. The tracking module 132 further includes a tracking model 136 for estimating the tracking information of the ROI from one image to another, e.g.; from frame to frame of a scene.

An encoder 122 is provided for encoding the output image into any known compression standard such as MPEG1, 2, 4, h.264, etc.

Figure 2:
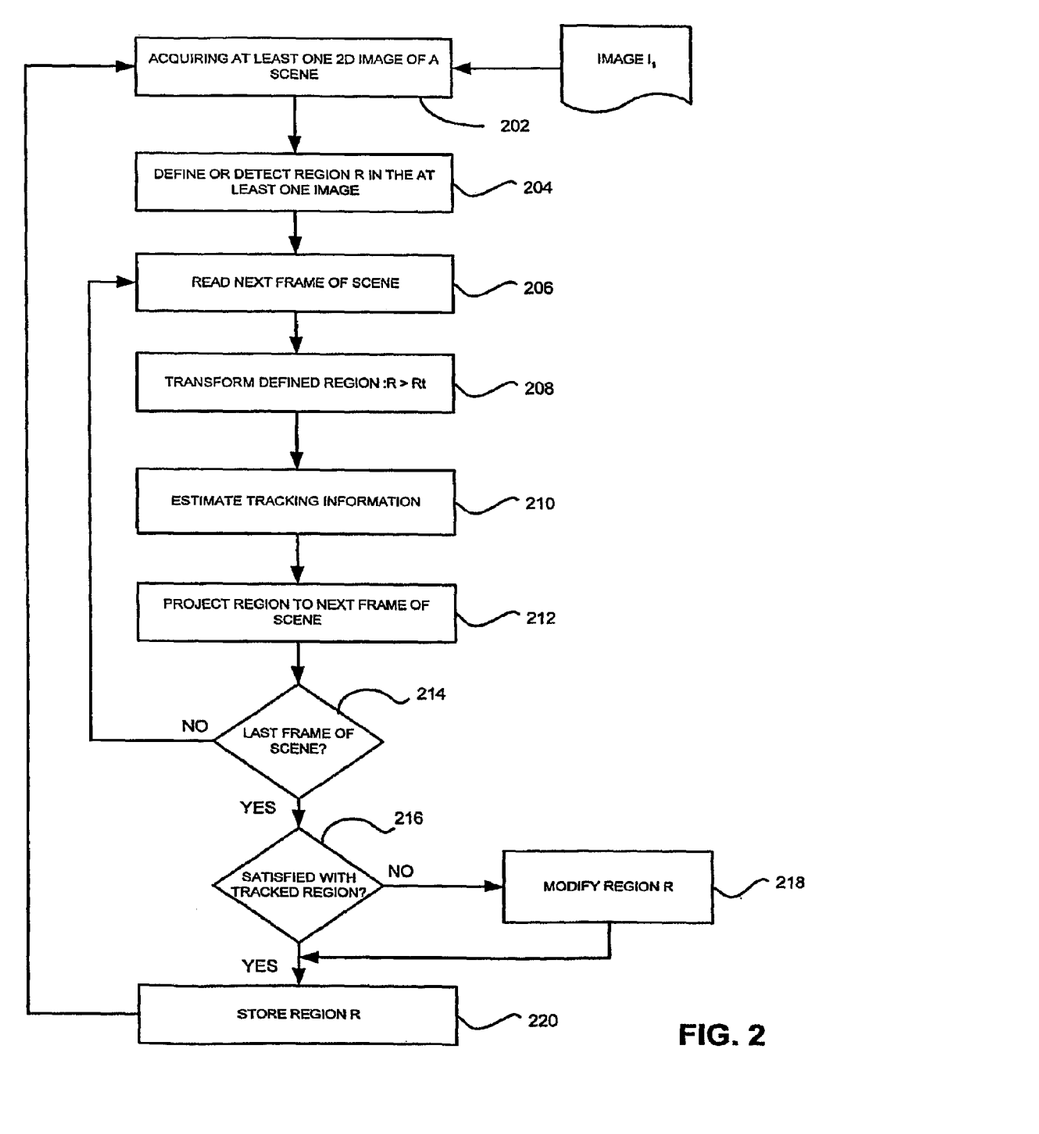
FIG. 2 is a flow diagram of an exemplary method for region-based tracking in images according to an aspect of the present disclosure.

FIG. 2 is a flow diagram of an exemplary method for tracking a region of interest (ROI) in images according to an aspect of the present disclosure. Initially, the post-processing apparatus 102 acquires at least one two-dimensional (2D) image (step 202). The post-processing apparatus 102 acquires at least one 2D image by obtaining the digital master video file in a computer-readable format, as described above. The digital video file may be acquired by capturing a temporal sequence of video images with a digital video camera. Alternatively, the video sequence may be captured by a conventional film-type camera. In this scenario, the film is scanned via scanning device 103.

It is to be appreciated that whether the film is scanned or already in digital format, the digital file of the film will include indications or information on locations of the frames, e.g., a frame number, time from start of the film, etc. Each frame of the digital video file will include one image, e.g., $I_1$, $I_2, \ldots I_n$.

In step 204, a region of interest R is defined or detected in at least one image. In one embodiment, an operator defines a region with banding artifacts using an interactive user interface such as user interface 112, e.g., by outlining a polygon region onto the image. In another embodiment, the region is detected by an automatic detection algorithm or function as will be described in relation to FIG. 3.

Figure 3:
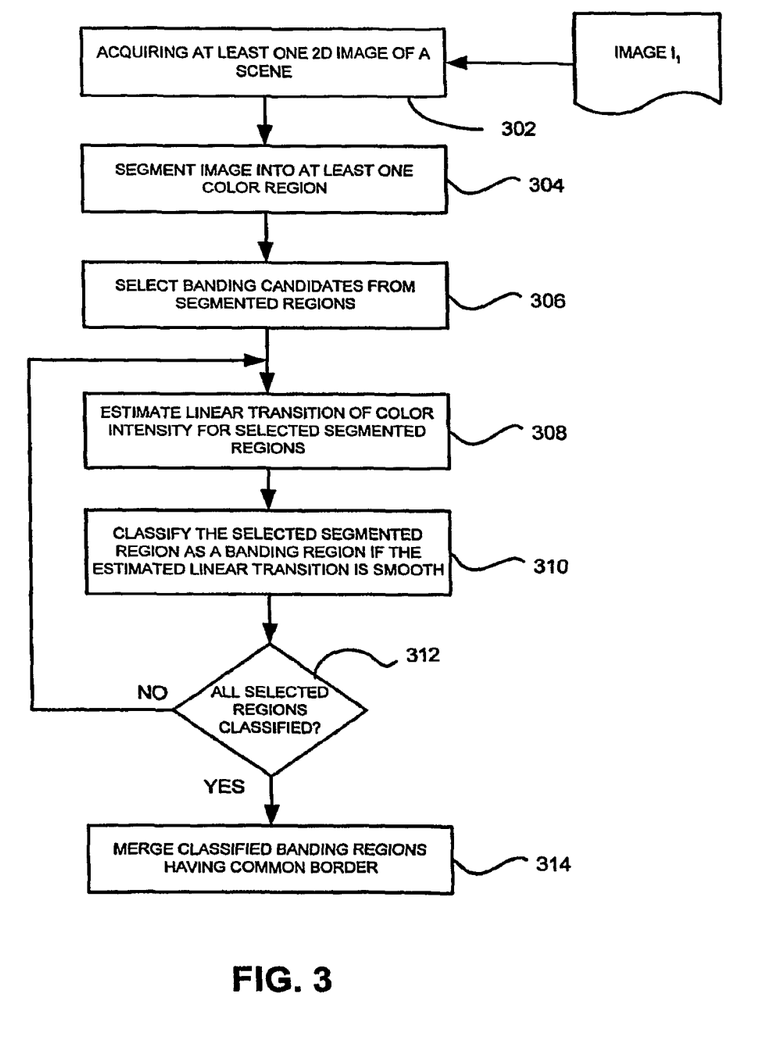
FIG. 3 is a flow diagram of an exemplary method for detecting a banding region in an image according to an aspect of the present disclosure.

Referring to FIG. 3, a two-dimensional (2D) image is acquired (step 302). In step 304, the image is segmented into at least one homogenous color region by the segmentation module 113. In color segmentation of the present disclosure, a mean shift algorithm or function is used to find the dominant colors in the image. The mean shift function is iteratively used in a color histogram space to find the local maximum. The color corresponding to the local maximum is assigned as a dominant color and removed from the histogram. The process will repeat to find the next dominant color. The iteration process stops after there is no more dominant colors. The image is segmented into regions based on these dominant colors.

After image segmentation, a list of regions is selected as banding candidates based on size and its statistical distribution (step 306). If the region size, e.g., a number of pixels, is smaller than a predetermined threshold, the region is discarded. In various embodiments, the threshold is set from about 50 to about 200 pixels. The variance of the color distribution of pixels inside the region is then calculated. If the variance is higher than a predetermined threshold, the region will be discarded. Finally, the regions left are selected as the candidates for banding regions.

In step 308, the linear transition of color intensity for the selected banding region candidates is estimated by the linear transition estimator 115. The linear transition is estimated by modeling the intensity surface of pixels in the segmented region. The surface modeling uses the following linear parametric model:

$$I(x,y) = ax + by + c \quad (1)$$

where I(x,y) is the predicted color intensity at location (x,y), a, b, c are constant coefficients. The above equation defines a 2D plane in the 3D space. That is, the input image is two-dimensional and the other dimension is the color intensity, thus, x, y, I will provide a three dimensional axis.

Figure 4:
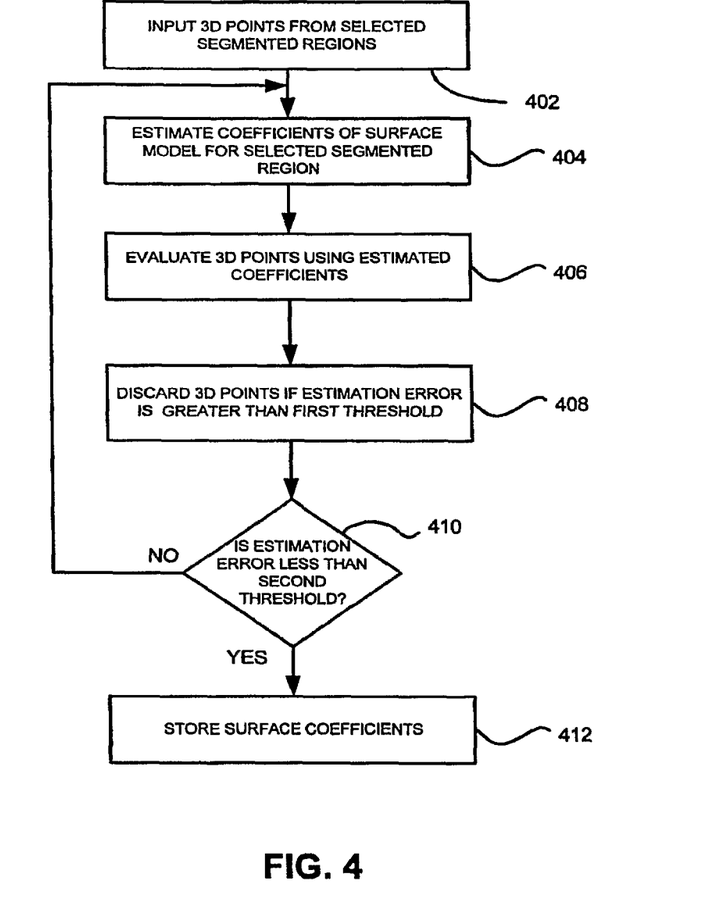
FIG. 4 is a flow diagram of an exemplary method for modeling the intensity of pixels in a region of an image according to an aspect of the present disclosure.

Next, the surface coefficients for the linear model are estimated as illustrated in FIG. 4. The surface coefficients are estimated using a robust and iterative estimation. The advantage of robust estimation as opposed to the regular Least Mean Square estimation is its robustness to outliers (for example, dirt in the film or small irrelevant objects in a region). Initially, in step 402, the 3D points from the selected segmented region is input into the model defined by equation (1). Robust estimation starts with an initial estimation of the surface coefficients using regular Mean Square Estimation (step 404). Then, a 2D linear surface is obtained using the estimated coefficients (406), e.g., at each pixel position (x,y), the estimated luminance intensity is calculated by equation (1). If the points are significantly deviated from the estimated 2D surface, e.g., by a predetermined first threshold, the points are classified as outliers, discarded and would not participate in the next run of coefficient estimation (step 408). The threshold for outliers is based on the average mean square difference of all the pixels. In step 410, if the estimation error is smaller than a second threshold (or using other stop criteria), the estimation and outlier rejection process is repeated using the 3D points excluding the outlier points until the estimation error is smaller than the second predefined threshold. Once the estimation error is less than the second predetermined threshold, the surface coefficients are stored (step 412).

Referring back to FIG. 3, after the coefficients are obtained, the linear transition of the color intensity of the selected segmented region is analyzed to determine if the linear transition is smooth, and if the transition is smooth, the region is classified as a banding region (310). The linear transition is analyzed by determining a surface fitting error. The surface fitting error is defined as the mean square error (or other error metric) between the real intensity surface in the image and the estimated intensity surface, as the following:

$$e = \sum_{(i,j) \in R} (I(x, y) - I_{(x,y)})^2 \quad (2)$$

where $I_{(x,y)}$ is the actual pixel value at the coordinate (x,y) in the image region R, and I(x,y) is the estimated pixel value by evaluating the surface equation with the estimated coefficients (a,b,c) in Eq. (1) at the coordinate (x,y). If the surface fitting error is below a threshold, and a, b are not both equal to zero, the linear transition is determined to be smooth and the region is classified as a banding region. The process then repeats until all selected segmented regions from step 306 are classified (step 312).

In step 314, the region detection module 111 determines if any of classified banding regions share a common border. For example, if two regions share predetermined number of pixels, the region detection module 111 will determine that the two regions share a common border. If at least two classified banding regions share a common border, the region detection module 111 will merge the at least two classified banding regions into a single banding region. The process iterates until there are no common borders among the banding regions.

Once the region, or regions, has been defined or detected, the method will return to step 206 of FIG. 2.

From the ROI, a binary mask is generated and is used in the apparatus for tracking the ROI, e.g., the detected region. The binary mask is an image with pixel values either 1 or 0. All the pixels inside the user-defined polygon or detected region have a value of 1, and other pixels have a value of 0. The binary mask can be used to represent a ROI. The next frame of the scene is then read in step 206.

Banding artifacts appear in smooth color grading areas. However, a general tracking algorithm requires some distinct features present in the region for a robust and accurate tracking. Thus, a tracking scheme using a different tracking region is provided. In step 208, the ROI R is grown or transformed to a larger region to capture more salient features of the region for tracking. The larger region with some salient features is called tracking region Rt. The region growing algorithm uses the boundary pixels of the ROI as seeds and a "watershed" implementation to grow the region.

For estimating tracking information, a six parameter tracking model 136 (e.g., an affine motion model) is used to track the region (step 210). The tracking region is first divided into 16×16 blocks, and the motion vector for each block is obtained by finding the best block match in the next frame using luminance intensity. The motion vectors of all the blocks are used to estimate the six parameters in the tracking model. A linear regression procedure is used to find the best parameters which minimize the errors between the predicted pixels and the actual pixels. The binary mask of ROI is projected to the next frame using the six parameter tracking model (step 212). In step 214, the apparatus determines if the last frame of the scene was processed. If not, the apparatus will return to step 206 until all the frames of the scene are processed. Once ROI is available for a number of frames, the process can be easily applied to the rest of scene automatically.

The apparatus provides real-time feedback on the tracking result. At step 216, an operator can evaluate the result, and modify the ROI if the result is not satisfactory (step 212). For example, the operator can view the ROI in a display of the user interface 112 to determine if the ROI was properly tracked. If the operator is not satisfied, the ROI could be modified and the tracking process will be repeated. In step 220, the binary mask of the ROI for each image or frame is stored into a binary file and used as the ROI for ROI-based error diffusion and band masking, as will be described below. Furthermore, the binary mask of ROI is stored into a binary file and can be carried over to the next stage. For example, if the next stage is MPEG4 AVG encoding, the information of ROI can be used by the encoder to allocate proper bits for ROI. This metadata can be stored in storage device 124 and associated with the images so it may be utilized in other processes.

Figure 5:
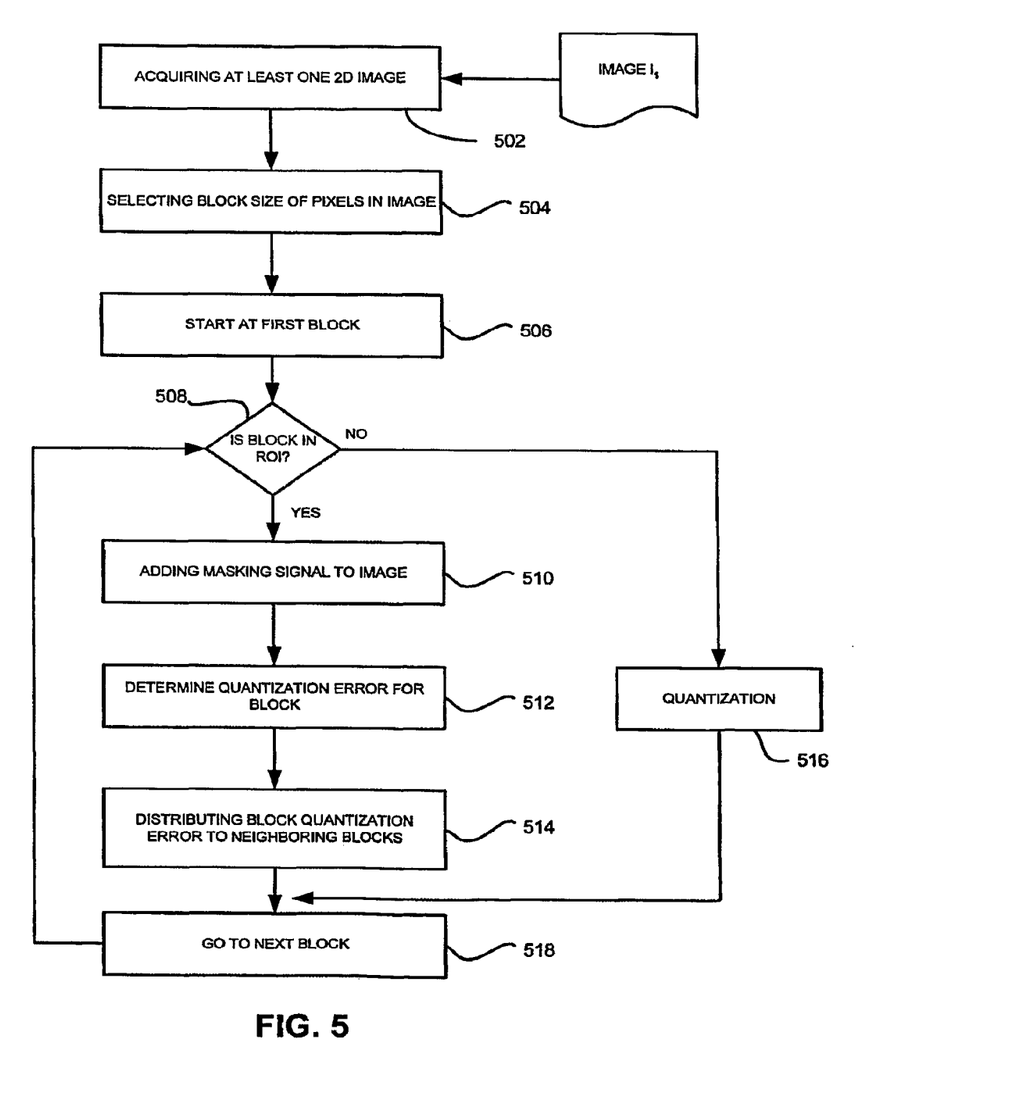
FIG. 5 is a flow diagram of an exemplary method for reducing artifacts in images according to an aspect of the present disclosure.

A flow chart of ROI-based error diffusion and band masking scheme is shown in the FIG. 5. As described above, at least one image to be processed is acquired in step 502.

In step 504, a block size is selected. The image can be divided into any number of blocks. A block is a number of pixels contained in a rectangular region, e.g., $B_{m,n}$, where m,n represent the block index. All of the blocks can have the same size, such as 2×2, 3×3, etc. The block size can also vary depending on local image attributes. The block size can be selected by an operator via the user interface 112, or it can be determined by the image size so that a constant ratio is kept for different image sizes. The error diffusion method of the present disclosure is working on the block level, as will be described below. Once the block size is selected, the block size will be kept the same for the same image.

It is to be appreciated that the block size can vary from a single pixel to any arbitrary size, such as 2×2, 2×3, 4×4. The usage of different block sizes gives the apparatus control of the spatial frequency of the masking signal. This is important if the following process is lossy compression, which tends to remove high spatial frequency. Adding a well-controlled masking signal will reduce the compression artifacts and avoid the banding re-appearing after lossy compression.

Once the block size is selected, all the blocks which make up the image will be processed starting with a first block (step 506). Initially, the apparatus will determine if the block is in the defined or detected region of interest (ROI) (step 508). If the block is not in the ROI, a simple quantization scheme is used to reduce the color bit depth (step 516), e.g., the least significant bits of the block are eliminated and the quantization error is not compensated. After step 516, the apparatus will go to the next block in the image (step 518).

In step 510, a noise signal, e.g., a masking signal, is added to the image via noise generator 116. Levels from 0 to 255 are assigned to pixels based on their distance, e.g., closeness, to the region boundary. The distance of at least one pixel in the block to a boundary of the defined region is determined and a value of a masking signal associated to the at least one pixel is assigned based on the determined distance. These levels are used to scale down the intensity of the masking signal, thus making a smooth transition in the region boundary area. The mean and variance of the pixel color values in the ROI is calculated. If a pixel's color difference from the mean is three times larger than the variance, it indicates that there is a significant feature that will not likely be the banding artifacts. To preserve this feature, level 0 is assign to this pixel, which means no noise will be added this pixel. An example of this is a scene of blue sky with stars, where banding artifacts appear in the sky. The apparatus 100 can select the blue sky as the ROI for de-banding processing. All the stars in the sky are properly preserved as their color value is significantly different from the mean value of pixels in ROI.

In step 512, a quantization error is determined for the block. Initially, a truncation function is performed on each block in the image via truncation module 118. The truncation function is employed to reduce the bit depth for each pixel in the block by dividing the bit depth value with a constant quantization factor Q, that is a power of 2. Generally, the quantization factor Q is equal to $2^x$, where x is the number of bits to be truncated. For example, for truncation from 10-bit data to 8-bit data, the constant quantization factor Q will be 4, i.e., $Q=2^2$. The truncating function is defined as the following:

$$I'_{i,j} = \frac{I_{i,j} + N_{i,j}}{Q}, I_{i,j} \in B_{m,n} \tag{3}$$

where $I_{i,j}$ is the pixel value inside the block, $N_{i,j}$ is the signal added before the truncation by the noise generator 116, and Q is the quantization factor. $I'_{i,j}$ is the truncated pixel value. In the truncation process, there is a rounding issue to be taken care of for the pixel values. For example, if $I'_{i,j}$ is equal to 1.75, i.e., 7 ($I'_{i,j}+N_{i,j}$) divided by 4 (Q), $I'_{i,j}$ need to be represented by an integer number. $I'_{i,j}$ can be 2 or 1 based on different rounding schemes as are known in the art.

Inside equation 3, $N_{i,j}$ is noise, e.g., white noise, and it reduces structure artifacts. Generally, $N_{i,j}$ has a random signal distribution. Via user interface 112, an operator can manually control the value range of $N_{i,j}$. By default, the value range of $N_{i,j}$ is from 0 to Q−1. By using the same noise for each pixel inside a selected block of the image, the noise pattern's spatial frequency will be low inside the block, which reduces the overall spatial frequency of the noise in the whole image. Since the spatial frequency of the noise is reduced, the noise, i.e., the masking signal, will survive the compression process and suppress artifacts during decompression.

Next, a quantization error is determined for each pixel inside the block as shown in equation (4) below and, the summation of all the quantization errors produces the block quantization error $E_{m,n}$, which is distributed into the neighboring blocks based on error diffusion coefficients.

$$E_{m,n} = \sum_{i,j}(I_{i,j} - QI'_{i,j}) \tag{4}$$

For the total block quantization error $E_{m,n}$, a portion of the quantization error e will be distributed to the neighboring blocks as determined by $$e = c(m,n)*E \tag{5}$$

where c(m,n) is an error diffusion coefficient.

In step 514, block quantization error is distributed to the neighboring blocks via error distribution module 120. The error distribution function inside each block is defined as following:

$$I_{i,j} = I_{i,j} + w_{i,j} e, \quad (6)$$
$$I_{i,j} \in B_{m,n}$$

$$w_{i,j} = \frac{1}{NM} \quad (7)$$
$$I_{i,j} \in B_{m,n}$$

where e is the total error distributed to the block $B_{m,n}$, N,M are the dimension of the block, $w_{i,j}$ is the weighting coefficients for block $B_{m,n}$. In one embodiment, the uniform distribution as shown in equation (6) is used to calculate the weighting coefficients. More complex function can be designed to calculate $w_{i,j}$, e.g., $w_{i,j}$ can be set proportional to the I(i,j).

The size of block $B_{m,n}$ determines the amount of spatial frequency that can be controlled in the error diffusion process and is chosen to achieve the best effect of masking the artifacts. However, a large block size tends to generate structured artifacts, which is not desirable in the error diffusion process. Such structured artifacts include block-boundary artifacts where 2 neighboring pixels in two different blocks will be transformed differently. $N_{i,j}$ in equation 1 is also used to destroy the potential structured artifacts with random noise inclusion. An exemplary block size of 2×2 has been found to be sufficient to process an image of 720×480 pixels (e.g., DVD resolution) with no visible block artifacts. It is to be appreciated other block sizes and image sizes may be employed with no resultant visible artifacts.

After the quantization has been performed in either step 516 or by steps 510 through 514, the apparatus will proceed to the next block in the image until all the blocks in the image are processed (step 518). After the image has been modified by the error distribution function, the image may be saved in a memory of the post-processing device, e.g., in storage device 124. Once all the images of a particular film have been modified, the images may be encoded via encoder 122 according to any conventional compression standard, such as MPEG1, 2, 4, h.264, etc. The compressed film 130 may then be stored in a storage device, e.g., storage device 124, or transferred to a removable storage device, e.g., a DVD.

Although the embodiment which incorporates the teachings of the present disclosure has been shown and described in detail herein, those skilled in the art can readily devise many other varied embodiments that still incorporate these teachings. Having described preferred embodiments for an apparatus and method for reducing artifacts in images (which are intended to be illustrative and not limiting), it is noted that modifications and variations can be made by persons skilled in the art in light of the above teachings. It is therefore to be understood that changes may be made in the particular embodiments of the disclosure disclosed which are within the scope and spirit of the disclosure as outlined by the appended claims. Having thus described the disclosure with the details and particularity required by the patent laws, what is claimed and desired protected by Letters Patent is set forth in the appended claims.

The invention claimed is:

1. A method for detecting a banding region in an image, the method comprising:
    segmenting at least one first image into at least one homogeneous color region;
    estimating the linear transition of color intensity for the at least one homogeneous color region; and
    if the linear transition of color intensity is substantially smooth, classifying the at least one homogenous color region as a banding region;
    determining a surface fitting error between the estimated intensity surface and the actual intensity surface in the at least one first image; and
    wherein if the surface fitting error is less than a predetermined threshold, determining the linear transition of color intensity is substantially smooth.

2. The method of claim 1, wherein the estimating step includes modeling the intensity surface of pixels in the segmented region using a linear surface model.

3. The method of claim 2, wherein the classifying step includes fitting the estimated intensity surface to the actual intensity surface in the at least one first image.

4. The method of claim 1, wherein the segmenting step includes performing a mean shift function to the at least one first image.

5. The method of claim 1, further comprising:
    determining a number of pixels of the at least one segmented region; and
    if the number of pixels is less than a predetermined threshold, discarding the at least one segmented region.

6. The method of claim 1, further comprising:
    calculating a variance of the color distribution of pixels of the at least one segmented region; and
    if the calculated variance is greater than a predetermined threshold, discarding the at least one segmented region.

7. The method of claim 1, further comprising:
    determining if each of the at least one classified banding regions share a common border; and
    if at least two classified banding regions share a common border, merging the at least two classified banding regions into a single banding region.

8. The method of claim 1, further comprising:
    tracking the detected banding region to at least one second image; and applying an error diffusion function to the detected banding region to mask banding artifacts in the at least one first and second images.

9. The method of claim 8, wherein the applying step further comprises:
    selecting a block size of pixels of the at least one image;
    determining if at least one block is within the detected banding region; adding a masking signal to the at least one block;
    determining a quantization error for the at least one block in the at least one image; and
    distributing the quantization error to neighboring blocks.

10. The method of claim 8, wherein the tracking step further comprises:
    generating a binary mask for the detected banding region of the at least one first image; and
    projecting the binary mask to the at least one second image to track the detected banding region.

11. An apparatus for detecting a banding region in an image, the apparatus comprising:
    an image segmentation module configured for segmenting at least one first image into at least one homogeneous color region;
    a linear transition estimator configured for estimating the linear transition of color intensity for the at least one homogeneous color region; and a region detection module configured for classifying the at least one homogenous color region as a banding region if the linear transition of color intensity is substantially smooth, wherein the region detection module is further configured for determining a surface fitting error between the estimated intensity surface and the actual intensity surface in the at least one first image;

and wherein if the surface fitting error is less than a predetermined threshold, determining the linear transition of color intensity is substantially smooth.

12. The apparatus of claim 11, wherein the linear transition estimator is further configured for modeling the intensity surface of pixels in the segmented region using a linear surface model.

13. The apparatus of claim 12, wherein the region detection module is further configured for fitting the estimated intensity surface to the actual intensity surface in the at least one first image.

14. The apparatus of claim 11, wherein the image segmentation module is further configured for performing a mean shift function to the at least one first image.

15. The apparatus of claim 11, wherein the region detection module is further configured for determining a number of pixels of the at least one segmented region; and if the number of pixels is less than a predetermined threshold, discarding the at least one segmented region.

16. The apparatus of claim 11, wherein the region detection module is further configured for calculating a variance of the color distribution of pixels of the at least one segmented region; and if the calculated variance is greater than a predetermined threshold, discarding the at least one segmented region.

17. The apparatus of claim 11, wherein the region detection module is further configured for determining if each of the at least one classified banding regions share a common border; and if at least two classified banding regions share a common border, merging the at least two classified banding regions into a single banding region.

18. The apparatus of claim 11, further comprising:
a tracking module configured for tracking the detected banding region in the at least one first image to at least one second image; and
an error diffusion module configured for applying an error diffusion function to the detected banding region to mask banding artifacts in the at least one first and second images.

19. The apparatus of claim 18, wherein the error diffusion module further comprises a signal generator configured for generating a masking signal to be applied to at least one image;
wherein the error diffusion module is further configured for selecting a block size of pixels of the at least one image, determining if at least one block is within the detected banding region;
determining a quantization error for the at least one block in the at least one image; and
distributing the quantization error to neighboring blocks.

20. An apparatus for detecting a banding region in an image comprising:
means for segmenting at least one first image into at least one homogeneous color region;
means for estimating the linear transition of color intensity for the at least one homogeneous color region; and
if the linear transition of color intensity is substantially smooth, means for classifying the at least one homogenous color region as a banding region,
wherein the means for classifying further comprises means for determining a surface fitting error between the estimated intensity surface and the actual intensity surface in the at least one first image; and
wherein if the surface fitting error is less than a predetermined threshold, means for determining the linear transition of color intensity is substantially smooth.

21. The apparatus of claim 20, wherein the means for estimating further comprises means for modeling the intensity surface of pixels in the segmented region using a linear surface model.

22. The apparatus of claim 21, wherein the means for classifying further comprises means for fitting the estimated intensity surface to the actual intensity surface in the at least one first image.

23. The apparatus of claim 20, wherein the means for segmenting further comprises means for performing a mean shift function to the at least one first image.

24. The apparatus of claim 20, wherein the means for classifying further comprises means for determining a number of pixels of the at least one segmented region; and if the number of pixels is less than a predetermined threshold, means for discarding the at least one segmented region.

25. The apparatus of claim 20, wherein the means for classifying further comprises means for calculating a variance of the color distribution of pixels of the at least one segmented region; and if the calculated variance is greater than a predetermined threshold, means for discarding the at least one segmented region.

26. The apparatus of claim 20, wherein the means for classifying further comprises means for determining if each of the at least one classified banding regions share a common border; and if at least two classified banding regions share a common border, means for merging the at least two classified banding regions into a single banding region.

27. The apparatus of claim 20, further comprising:
means for tracking the detected banding region in the at least one first image to at least one second image; and
means for applying an error diffusion function to the detected banding region to mask banding artifacts in the at least one first and second images.

28. The apparatus of claim 27, wherein the means for classifying further comprises means for generating a masking signal to be applied to at least one image;
means for selecting a block size of pixels of the at least one image, means for determining if at least one block is within the detected banding region;
means for determining a quantization error for the at least one block in the at least one image; and
means for distributing the quantization error to neighboring blocks.

* * * * *